United States Patent
Culler

(10) Patent No.: US 8,142,656 B1
(45) Date of Patent: *Mar. 27, 2012

(54) WASTEWATER CONCENTRATOR SYSTEM

(75) Inventor: Paul L. Culler, Tequesta, FL (US)

(73) Assignee: Ecolivegreen Corp., Parkland, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/326,671

(22) Filed: Dec. 15, 2011

Related U.S. Application Data

(60) Continuation of application No. 13/274,350, filed on Oct. 16, 2011, now Pat. No. 8,101,078, which is a continuation-in-part of application No. 13/050,665, filed on Mar. 17, 2011, now Pat. No. 8,062,522, which is a division of application No. 12/954,809, filed on Nov. 26, 2010, now Pat. No. 8,066,887.

(51) Int. Cl.
*B01D 61/00* (2006.01)
*C02F 1/00* (2006.01)

(52) U.S. Cl. ......... 210/321.6; 210/96; 210/87; 210/260; 210/512.1; 210/170.03; 210/920; 210/650; 210/652; 210/747.1

(58) Field of Classification Search ............... None
See application file for complete search history.

(56) References Cited

U.S. PATENT DOCUMENTS

| | | | |
|---|---|---|---|
| 3,805,817 A | 4/1974 | Smith | |
| 4,415,452 A | 11/1983 | Heil | |
| 4,501,664 A | 2/1985 | Heil | |
| 5,084,189 A | 1/1992 | Richter | |
| 5,910,249 A | 6/1999 | Kopp | |
| 8,062,522 B1 | 11/2011 | Culler | |
| 8,066,887 B1 | 11/2011 | Culler | |
| 2007/0041790 A1 | 2/2007 | Cripps | |
| 2009/0176638 A1 | 7/2009 | Bella | |

FOREIGN PATENT DOCUMENTS

| | | |
|---|---|---|
| GB | 454597 A | 10/1936 |
| JP | 2000317447 A | 11/2000 |
| WO | 9527682 | 10/1995 |
| WO | 2010062724 A3 | 6/2010 |

OTHER PUBLICATIONS

EVTN Voraxial Grit Separator Hillsborough County Demonstration Project Report PO No. DPWA03728202, Sep. 2004, pp. 1-12, Envro Voraxial Technology Inc., Fort Lauderdale, FL.
Notice of Allowance mailed Dec. 12, 2011 in co-pending U.S. Appl. No. 13/274,350 "Wastewater Concentrator", Paul L. Culler.

*Primary Examiner* — Krishnan S Menon
(74) *Attorney, Agent, or Firm* — Alan M. Flum; Stone Creek LLC

(57) ABSTRACT

Disclosed is a system for reducing the demand of wastewater volume flowing through a wastewater collection piping system and thereby increasing the effective capacity of the system. A portion of the wastewater is diverted from a sewer main. The solids are separated from the liquid, for example, by a vortex separator. The recovered liquid can be treated and made available for reuse or can be disposed of, for example, in a body of water or pumped into the ground. The concentrated solids are reintroduced into the main sewage line in a portion that adjusts the wastewater loading in the sewer main to a predetermined amount or predetermined range. Also disclosed is a system capable of reintroducing the concentrated solids into the sewer main in a portion that adjusts the solids loading in the sewer main to a predetermined amount or predetermined range.

24 Claims, 13 Drawing Sheets

WASTEWATER CONCENTRATOR SYSTEM

This application is a continuation of U.S. patent application Ser. No. 13/274,350 filed on Oct. 16, 2011, which is a continuation in part of U.S. patent application Ser. No. 13/050,665 filed on Mar. 17, 2011 issued as U.S. Pat. No. 8,062,522 on Nov. 22, 2011, which is a divisional of U.S. patent application Ser. No. 12/954,809 filed on Nov. 26, 2010 issued as U.S. Pat. No. 8,066,887 issued on Nov. 29, 2011. The entire contents of U.S. patent application Ser. No. 12/954,809, 13/050,665 and 13/274,350 are hereby incorporated by reference.

FIELD OF INVENTION

The invention relates to wastewater transport, treatment and processing systems. Specifically, the invention relates to a system for diverting and processing wastewater from the wastewater collection piping system for the purpose of reducing the total liquid loading on the collection piping system.

BACKGROUND

Wastewater occurs whenever a foreign substance is added to water that is not considered to add positive value to the water. The water is the carrier for these undesirable components, such as silt, dirt, ionic species, chemicals and sanitary fecal material. The water can be re-purified, removing the contaminants by mechanical, chemical or biological means.

Sanitary wastewater as it enters a biological treatment plant contains 1.5%-2.0% of suspended solids that are mostly consumed by bacteria in the reaction vessel. The remaining solids, or sludge is carried off and disposed of. The wastewater suspended solids are often referred to as the Biological Oxygen Demand (BOD). This number is roughly 250-mg/liter for raw sanitary wastewater. A four member household can typically produce 550-750 liters per day of sanitary wastewater. In addition to the suspended solids (BOD), 125-150 mg/liter of total dissolved solids (TDS) are added. As an illustrative example, if water were to enter a household with 300 mg/liter of TDS, the same water will leave the household at 425-450 mg/liter TDS. Therefore, the water leaving the home is "carrying off" human waste, soap and other materials from the shower, laundry, kitchen, and other drainage pipes carrying household wastewater.

The wastewater from residential homes and other dwellings as well as restaurants, hotels, schools, and other commercial buildings finds its way to a wastewater or sewage treatment plant via forced (pumped) or gravity piping systems. This wastewater collection piping system is often referred to as a sewer main.

The wastewater treatment plant can be configured in numerous ways with strainers, settling basins, biological reactors and filters. The primary goal is to reduce the BOD to less than <5 in the treated wastewater. The water is then further treated and often used for irrigation, or returned to deep wells, rivers or other bodies of water.

Municipal wastewater treatment plants at the time of their construction are often designed for projected future urban growth. Years after their construction, they are often expanded, as required, to satisfy actual urban growth demand. Similarly, wastewater collection piping systems are designed to handle a given quantity of wastewater based on projected demand. For the purpose of this disclosure, the term "wastewater loading" is defined as a quantity of wastewater flowing through a sewer main per unit time. Also for the purpose of this disclosure, the term "solids loading" is defined as a quantity of solids (i.e. matter with specific gravity greater than one) contained in the wastewater in a sewer main.

In growing cities and suburbs, many of the wastewater collection piping systems are overloaded or will be overloaded in the future with not enough capacity to handle the demand for wastewater flow. Those skilled in the art have devised several ways to remedy this situation. One solution is to lay parallel pipes or replace the current pipes with larger pipes to accommodate the additional wastewater loading. Another solution is to build additional waste treatment facilities to handle the additional loading. Both solutions can be expensive to implement. In addition, replacing or adding new pipe can be disruptive to a large portion of the neighborhoods and roads where the new pipes are being laid.

For the forgoing reasons, there is a need for a method, system or apparatus that can adjust the wastewater loading in a wastewater collection system in order to increase the system capacity.

SUMMARY

This Summary introduces a selection of concepts in simplified form that are described the Description. The Summary is not intended to identify essential features or limit the scope of the claimed subject matter.

The present invention is directed to a method, system, and apparatus that satisfy this need of adjusting the wastewater loading in a wastewater collection system in order to increase the collection system capacity.

An area of focus in the art has been to increase the system capacity by either increasing the volume capacity of the piping system by using larger pipes or parallel pipes in combination with increasing the capacity of the wastewater treatment plants. The inventor made the following observation. Wastewater treatment plants are often capable of handling a much higher amount of total suspended solids in the wastewater. The inventor also observed that there are potential benefits having higher suspended solids in the wastewater. For example, the biological treatment plant would operate a lot more efficiently if the suspended solids (BOD) to wastewater ratio or suspending solids (BOD) loading is increased. In many cases, the inventor estimates, the BOD loading could be doubled without increasing the plant capacity.

Based on this observation, a system and method in accordance with principles of the invention, can increase the effective volume (suspended solids loading) capacity of a wastewater piping collection system without the need to use larger pipes or adding additional parallel pipes. To accomplish this, in one embodiment, in accordance with the principals of the invention, a system located remotely from the wastewater treatment plant, diverts a portion of the wastewater from the wastewater piping collection system, or sewer main, separates the solid from the liquid, treats the recovered water for use locally, or for disposal, and reintroduces the concentrated solids back into the main sewage line that adjusts the wastewater loading of the wastewater piping collection system by a predetermined amount. The predetermined amount, in one embodiment, can be based on pre-determined solids to liquid ratio or alternatively on a desirable level of wastewater loading in the wastewater piping system or both. It can also be based on more complex ratios.

As a result, this system reduces the volume of water flowing through the piping system and increases the percent of concentrated solids and BOD. A number of these systems can be strategically placed around an urban and sub-urban area in order to increase the effective capacity of the wastewater treatment piping system without the need for new pipes. The liquid, which in one embodiment can be treated by mechanical, electrical, or chemical means alone or in combination can be used locally for landscape or crop irrigation, or in another embodiment, can be used as potable water. In further embodiments, can be used as industrial water, for example, boiler feeds makeup or other industrial process applications. In an alternative embodiment, the liquid can be treated, for example, by electrical, chemical, thermal, or mechanical means alone or in combination, and be disposed of, for example, by pumping it into the ground, or by diverting the treated liquid into bodies of water, for example, rivers, streams, lakes, or the ocean.

DRAWINGS

These and other features, aspects, and advantages of the present invention will become better understood with regard to the following description, appended claims, and accompanying drawings where:

DESCRIPTION

Figure 1:
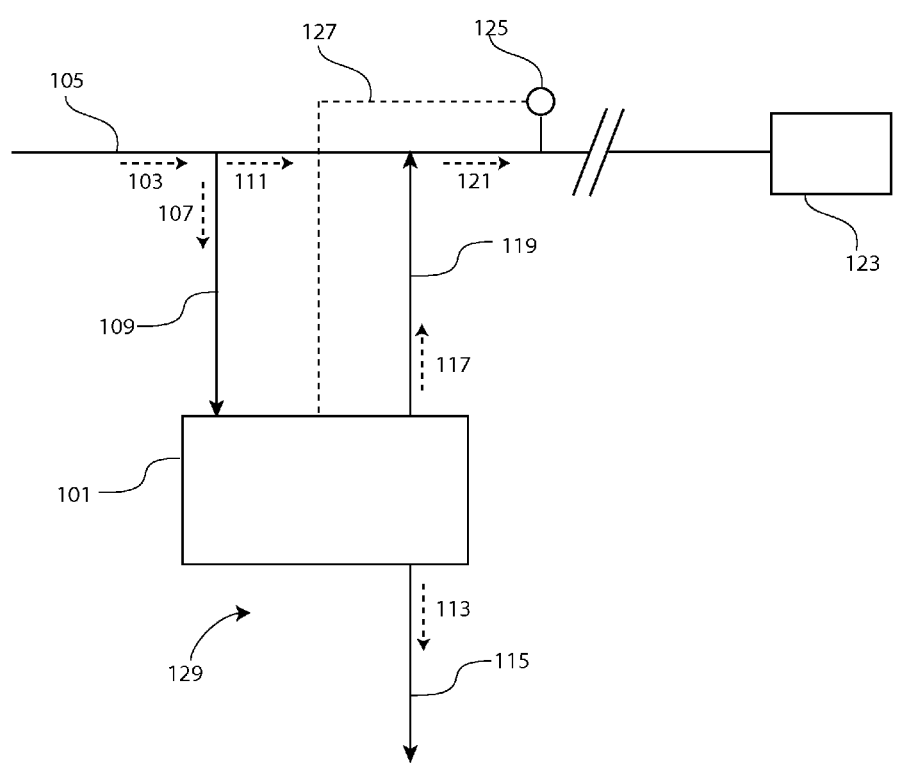
FIG. 1 shows a high-level system diagram of a wastewater concentrator system in accordance with principles of the invention.

Referring now to the drawings in detail wherein like numerals indicate like elements throughout the several views, FIG. 1 illustrates a system diagram of a wastewater concentrator system 101 in accordance with the principles of the invention. In one embodiment, raw wastewater 103 flows through the sewer main 105. A portion of the raw wastewater 107 is diverted from the sewer main 105 through an inlet pipe 109 into the wastewater concentrator system 101. The non-diverted wastewater 111 remains in the sewer main 105. In accordance with principles of the invention that will be described, the wastewater is separated into separated liquid 113 through an outlet pipe 115 and concentrated solids 117 through a second outlet pipe 119. The separated liquid 113 can be diverted for local reuse. In one embodiment, the separated liquid 113 is mostly water but may contain BOD or dissolved solids. This can be pumped deep into the ground in order to facilitate natural filtration. In accordance with local environmental or governmental regulations, the separated liquid 113 can be further purified before pumping into the ground. In another embodiment, the separated liquid 113 is further purified and sterilized and can be used for agricultural or commercial irrigation or for drinking water. In an alternative, embodiment, the separated liquid 113 can be further purified and disposed of into a body of water. For the purpose of this disclosure, the term "body of water" can refer to natural or man-made bodies of water, for example, oceans, seas, lakes, basins, or ponds as well as natural or man-made waterways, for example, rivers, streams, or canals. In another embodiment, the separated liquid 113 can be further purified and used for cooling tower makeup water or for other industrial processes.

The separated liquid 113 can be treated either for reuse or for disposal, for example, by electrical, chemical, thermal, or mechanical means alone or in combination. Electrical means can include, for example, UV light, electrically produced ozone, and electro-dialysis. Chemical means can include, for example, chlorination and other chemical disinfectants. Thermal means can include, for example, pasteurization, boiling, distillation, or solar heating. Mechanical means can include, for example, media or multi-media filtration, membrane filtration, cartridge filtration, and aeration. The above examples are meant to be exemplary and not limiting, other means of electrical, chemical, thermal, and mechanical means are possible.

The concentrated solids 117 in the second outlet pipe 119 are reintroduced in the sewer main 105. The concentrated solids 117 are combined with the non-diverted wastewater 111 to form concentrated wastewater 121 in the sewer main. The resulting concentrated wastewater 121 has increased suspended solids. A portion of wastewater has been removed from the sewer main 105 that is approximately equal to the separated liquid 113 diverted through the outlet pipe 115. This has the effect of increasing the system capacity of the sewer main 105 by an amount equal to the separated liquid 113. By increasing the system capacity of the sewer main 105 in this way, the wastewater loading of the sewer main 105 has been effectively been decreased.

In accordance with principals of the invention, the wastewater loading of sewer main 105 is adjusted to a pre-determined level or pre-determined amount. This pre-determined amount may be set in accordance with a number of factors. For example, the pre-determined level may be set in order to make sure that the sewer main 105 is not over loaded during peak capacity. Similarly, the pre-determined level may be set in order to assure that the wastewater treatment plant 123 supplied by the sewer main 105 is not over loaded during peak demand. In one embodiment, a flow transmitter 125 determines the rate of flow of the concentrated wastewater 121 in the sewer main 105. The flow transmitter 125 communicates with the wastewater concentrator 101 through a first signal path 127. This information transmitted through the signal path can take many alternative forms, for example, analog voltage, or a digital signal. This may be either through wire or by wireless means.

One advantage of this wastewater concentrator system 101 is that it may be located where it is most needed. It may be desirable for the wastewater concentrator location 129 to be in an area of high depend where the sewer main 105 capacity is challenged. This may be in an urban or sub-urban area far away from the wastewater treatment plant 123. Under other circumstances, where the demand on the system is more uniform, it may be desirable to locate the wastewater concentrator location 129 may be right outside of the wastewater treatment plant.

Figure 2:
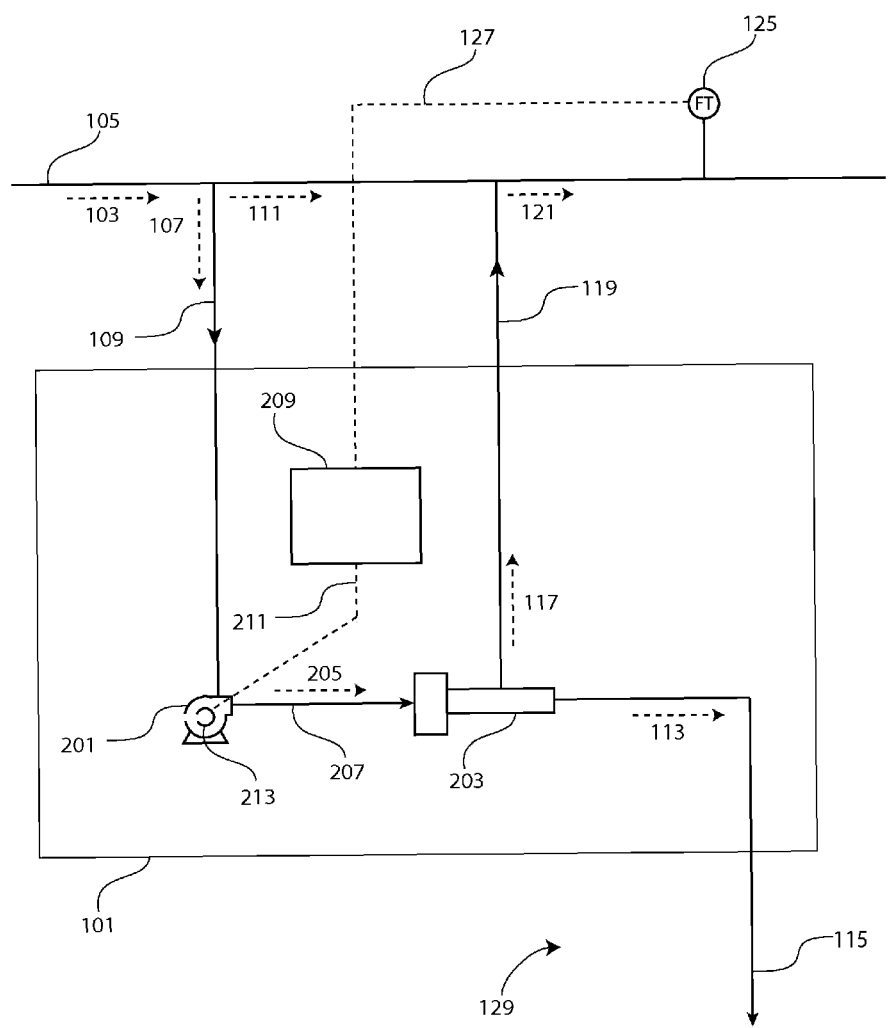
FIG. 2 shows a more detailed system diagram of the wastewater concentrator system of FIG. 1.

FIG. 2 is an embodiment, in accordance with principals of the invention, of FIG. 1. The diverted raw wastewater 107 flows through the inlet pipe 109 to a feed pump 201. The feed pump 201 supplies a cyclone or vortex separator 203 post-feed pump wastewater 205 through feed pipe 207. The feed pump 201 may be any pump capable of being controlled with a variable rate of flow and capable of supplying net positive suction pressure to the vortex separator 203. For example, in one embodiment the feed pump 201 is a centrifugal feed pump. In another embodiment, the feed pump 201 is a centrifugal grinder pump. A grinder pump takes larger solid objects, for example, rags, condoms, tampons, or sanitary napkins, grinds or macerates them into smaller particulates. In another embodiment, the feed pump 201 and vortex separator 203 may be combined into one unit that performs the function of both feed pump and vortex separator.

In FIG. 2, the vortex separator 203 takes the post feed pump wastewater 205 and separates it into concentrated solids 117 that flow through the second outlet pipe 119 and separated liquid 113 that flows through the outlet pipe 115. The vortex separator 203 uses centrifugal force to spin the wastewater forcing the heavier materials to the outside periphery of a containment pipe. The separated liquid 113, which is mostly water, with a lower specific gravity, lighter, stays to the center of the containment pipe as the solution is flowing downstream in the containment pipe. The concentrated solids exit at the periphery of the containment pipe through the second outlet pipe 119, while the mostly water or separated liquid 113 is drawn off of the center of the end of the containment pipe though the outlet pipe 115. In one embodiment, the vortex separator 203 used is sold under the trade name "voraxial separator" and sold by Enviro Voraxial Technology Inc. In another embodiment, the vortex separator 203 is combined with feed pump 201.

The basic principles of a vortex separator 203 are taught by U.S. Pat. No. 5,084,189 (Richter). The separator includes an impeller mechanism with a hollow core and a decreasing axial pitch in the direction of fluid flow. The combination of hollow core and axial pitch of the impeller mechanism creates a vortex or cyclone where lighter material stays in the center of the vortex where heavier material is force to the periphery.

Figure 3:
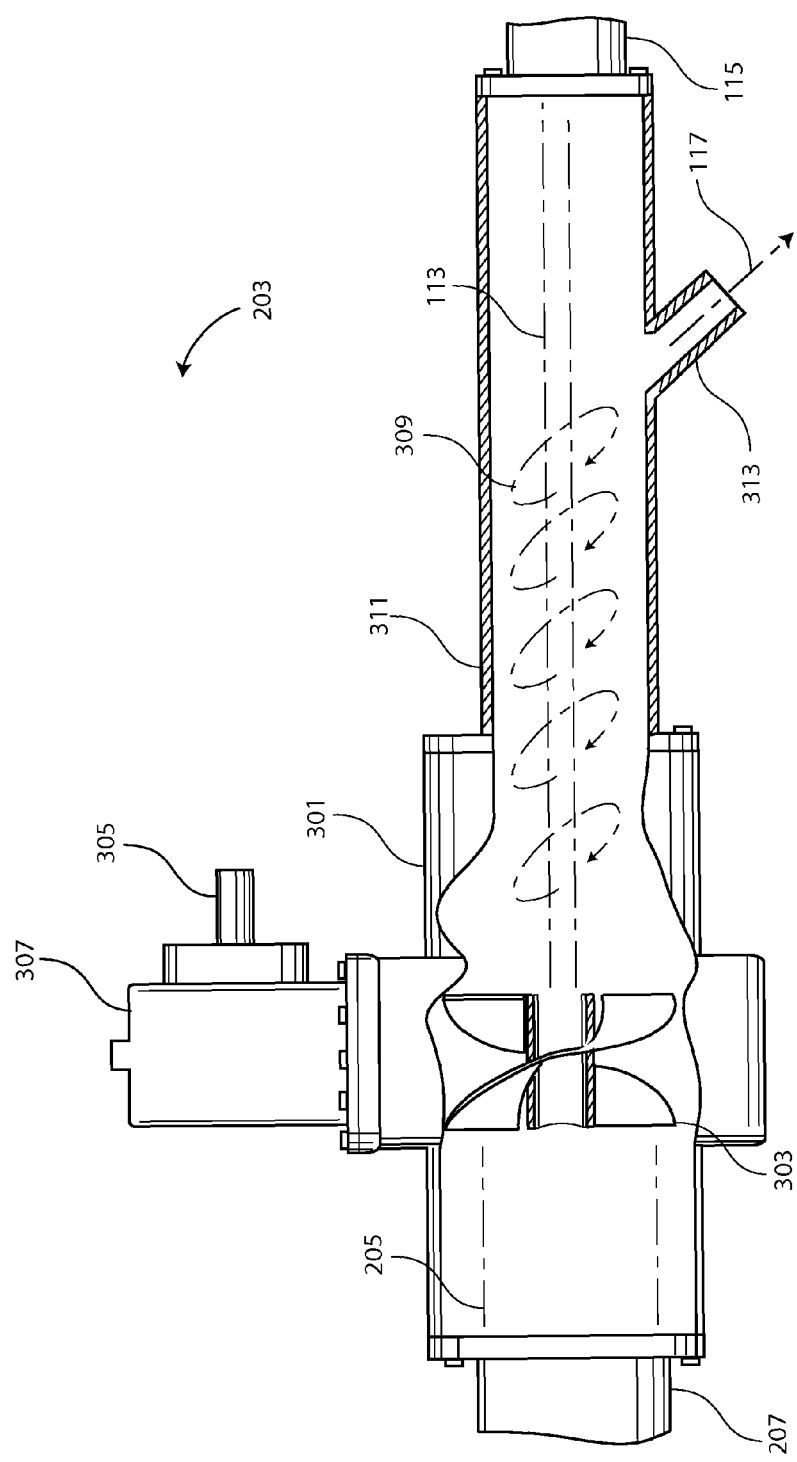
FIG. 3 shows an embodiment of a vortex separator using centrifugal force for separating the concentrated solids and liquid wastewater.

FIG. 3 illustrates in more detail one example of a vortex separator 203. The vortex separator 203 includes a housing 301. Within the housing 301 are impellers 303. The impellers 303 have hollow cores and a decreasing axial pitch in the direction of fluid flow. The impellers are driven by a drive shaft 305 attached to a gear box 307. Other pump arrangements for driving the impellers 303 are also possible. The housing 301 is coupled to a discharge assembly or separation containment pipe 311. This discharge assembly includes the containment pipe as described in a previous paragraph of this disclosure. The impeller pitch and hollow core impeller center create an outer portion of the vortex 309 with the concentrated solids 117, which are heavier, being forced to the periphery and lighter water being contained in as a separated liquid 113 in the center of the vortex or cyclone. The concentrated solids 117 are taken off the outside periphery of the separating column. The concentrated solids contained in the outer portion of the vortex 309 exits the separation containment pipe 311 through a solids discharge port 313 as a concentrated solids stream 117. The separated liquid 113 is removed through the outlet pipe 115. The solids discharge port 313 is angled in the direction and pitch of the cyclone in order to more effectively separate the concentrated solids.

Referring again to FIG. 2, the flow transmitter 125 measures the rate of flow of the concentrated wastewater 121 in the sewer main 105 and communicates this information through a first signal path 127 to a control system 209. The control system 209 controls the speed of the feed pump 201 in order to adjust the rate of flow of diverted raw wastewater 107 in the inlet pipe 109 and to the vortex separator 203. In one embodiment, a variable frequency drive or VFD 213 controls the feed pump 201 through a second signal pathway 211. The second signal path way can be, for example, an analog drive current, or digital signal or analog voltage and may be wired or wireless.

The control system 209 controls the rate of flow of the feed pump 201 in order to adjust the wastewater loading of the sewer main 105 to the pre-determined level or pre-determined amount. In one embodiment, the control system 209 uses an algorithm similar to the one shown in FIG. 4, to adjust the wastewater loading of the sewer main 105 to the pre-determined amount. The post system wastewater loading is determined 401 and compared 403 to the pre-determined amount or target wastewater loading 405. In one embodiment, if the post system wastewater loading 401 is less than the target wastewater loading 403 than the rate of flow is decreased 407, if the post system wastewater loading 401 is greater than the target wastewater loading 405, than the rate of flow is increased 409, and if the post system wastewater loading 401 is approximately equal to target wastewater loading 405, than the rate of flow is not adjusted 411. The algorithm loops back 413 to determine pre-system wastewater loading step 401 and repeats again.

In an alternate embodiment, the target wastewater loading 405 is not a specific value but a range of values. This pre-set range can be set in order to enhance stability of the feedback control system and the life of the variable frequency drive. The rate of flow would be decreased 407 if the post-system wastewater loading 401 was less than the pre-set range, increased rate of flow 409 would occur if the post-system wastewater loading 401 was greater than the pre-set range, and steady rate of flow 411 would continue if the post-system wastewater loading was within the pre-set range.

Figure 4:
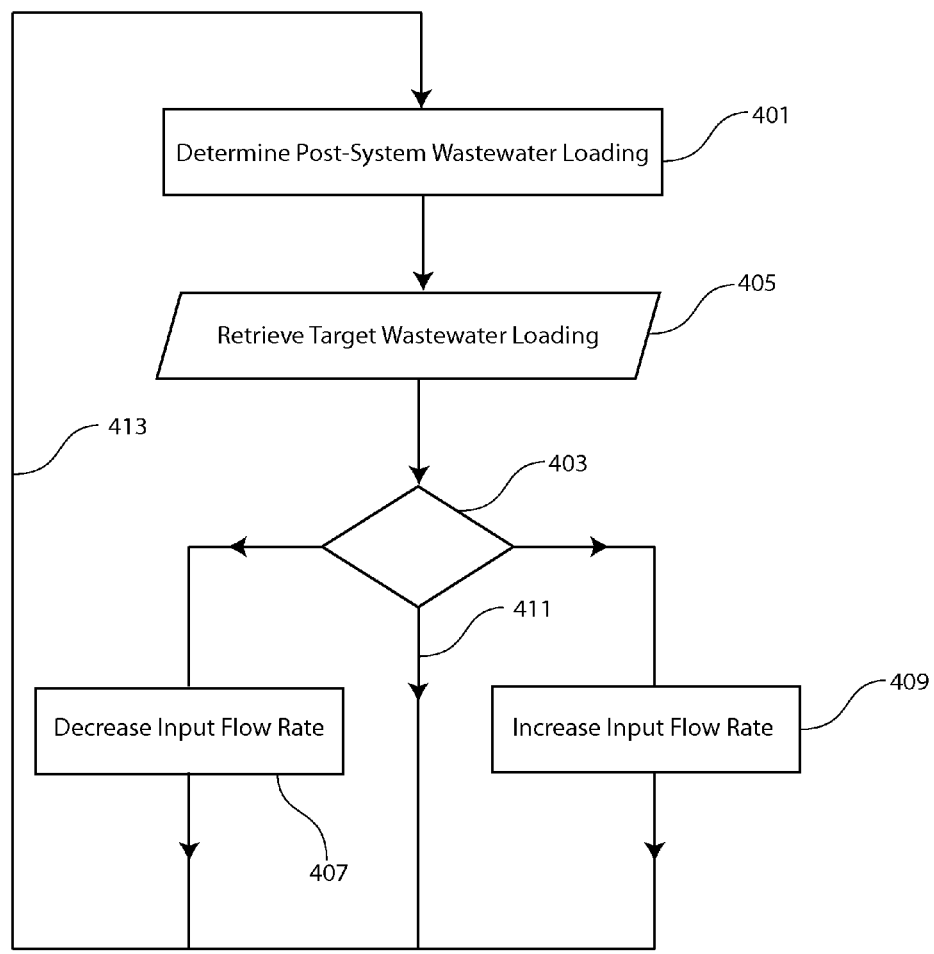
FIG. 4 shows a flow chart diagram in accordance with principles of the invention for controlling the wastewater loading in sewer main.

Referring to both FIG. 4 and FIG. 2, determining the post system wastewater loading 401 in the control system 209 is facilitated by data from the flow transmitter 125. The control system 209 compares the target wastewater loading 405 to the post system wastewater loading 401 and either adjusts directly or generates a signal to control the VFD 213 in order to control the rate of flow. If the post system wastewater loading 401 of the sewer main 205 is too high, then the VFD 213 speed is increased in order to increase the rate of flow to generate more separated liquid 113 and divert more wastewater from the sewer main 105. If the post system wastewater loading 401 of the sewer main 105 is too low, then the VFD 213 speed is decreased in order to decrease the rate of flow to generate less separated liquid 113 and divert less wastewater from the sewer main.

The target wastewater loading 405, in one embodiment is loaded into either program or data storage memory in the control system 209. Optionally, the target wastewater loading 405 level may be adjusted on-site at the wastewater concentrator or remotely. For example, it can be updated through wired or wireless means such USB, 802.11, Ethernet, 3G or other standard communication protocol.

This algorithm of FIG. 4 can be stored in the form of program instructions, for example, in a memory device connected to or internal to a microcontroller or microprocessor, a programmable logic device, a remote personal computer (PC) controlling the control system 209, and executed by any combination of these devices.

Figure 5:
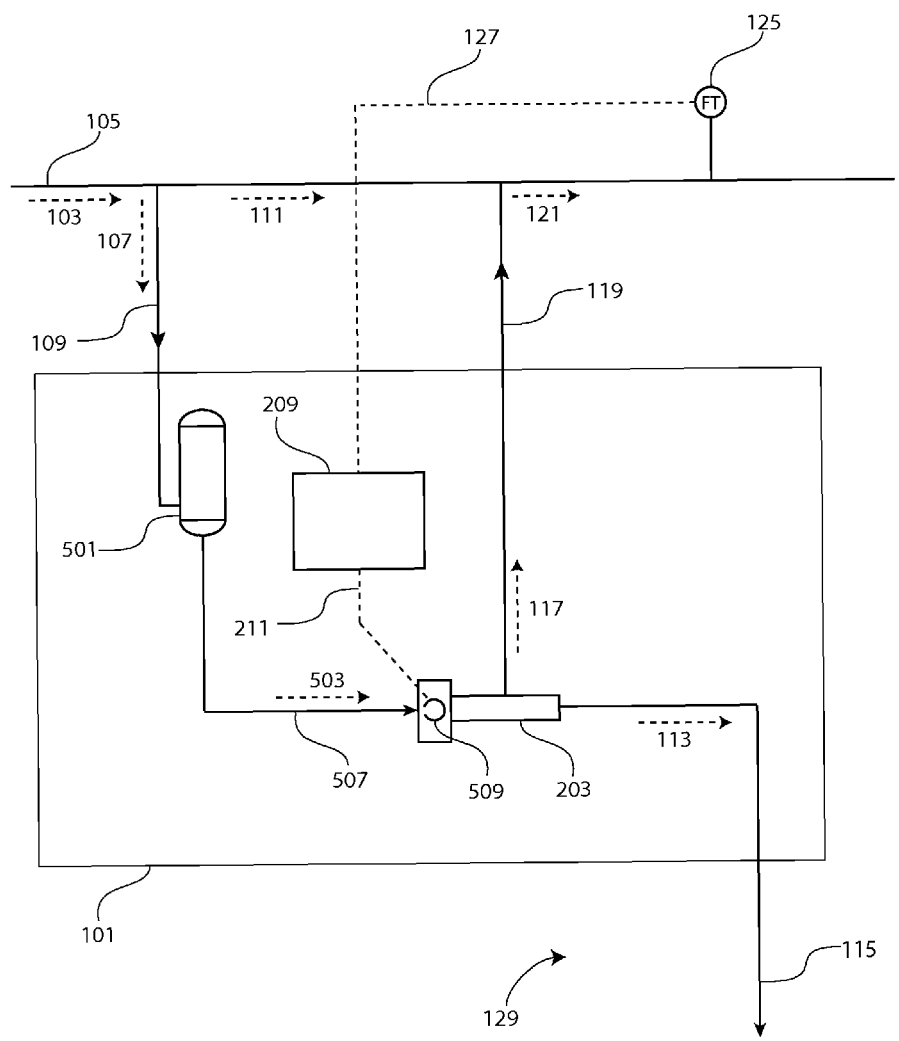
FIG. 5 shows a system diagram of a wastewater concentrator system of FIG. 1 where the vortex separator is fed by a head tank.

When there is sufficient pressure created in the inlet of the vortex separator 203, for example, by a gravity feed, a feed pump 201 as shown in FIG. 2 may not be necessary. FIG. 5 shows an alternative embodiment where an elevated tank or head tank 501 supplies diverted wastewater 503 through a pipe 507 to the vortex separator 203. A VFD 509 is attached to the vortex separator 203. Varying the speed of the VFD 509 attached to the vortex separator 203 controls the amount of wastewater diverted 107 from the sewer main 105.

Referring to both FIG. 4 and FIG. 5, the control system 209 controls the rate of flow of the VFD 509 attached to the vortex separator 203 in order to adjust the wastewater loading of the sewer main 105 to the pre-determined level or pre-determined amount. As previously described, the control system 209 uses an algorithm similar to the one shown in FIG. 4, to adjust the wastewater loading of the sewer main 105 to the pre-determined amount. The control system 209 compares the target wastewater loading 405 to the post system wastewater loading 401, for example, provided by flow transmitter 125, and either adjusts directly or generates a signal to control the VFD 509 attached to the vortex separator 203 in order to adjust the rate of flow. If the post system wastewater loading 401 of the sewer main 205 is too high, then the VFD 509 speed is increased in order to increase the rate of flow to generate more separated liquid 113 and divert more wastewater from the sewer main 105. If the post system wastewater loading 401 of the sewer main 105 is too low, than then the VFD speed is decreased in order to decrease the rate of flow to generate less separated liquid 113 and divert less wastewater from the sewer main.

It may be desirable to adjust the wastewater concentrator 101 to a pre-determined solids loading instead of a pre-determined wastewater loading. For example, when it is known that the wastewater concentrator 101 has the potential to overload the solids loading capacity of the wastewater treatment plant 123.

Figure 6:
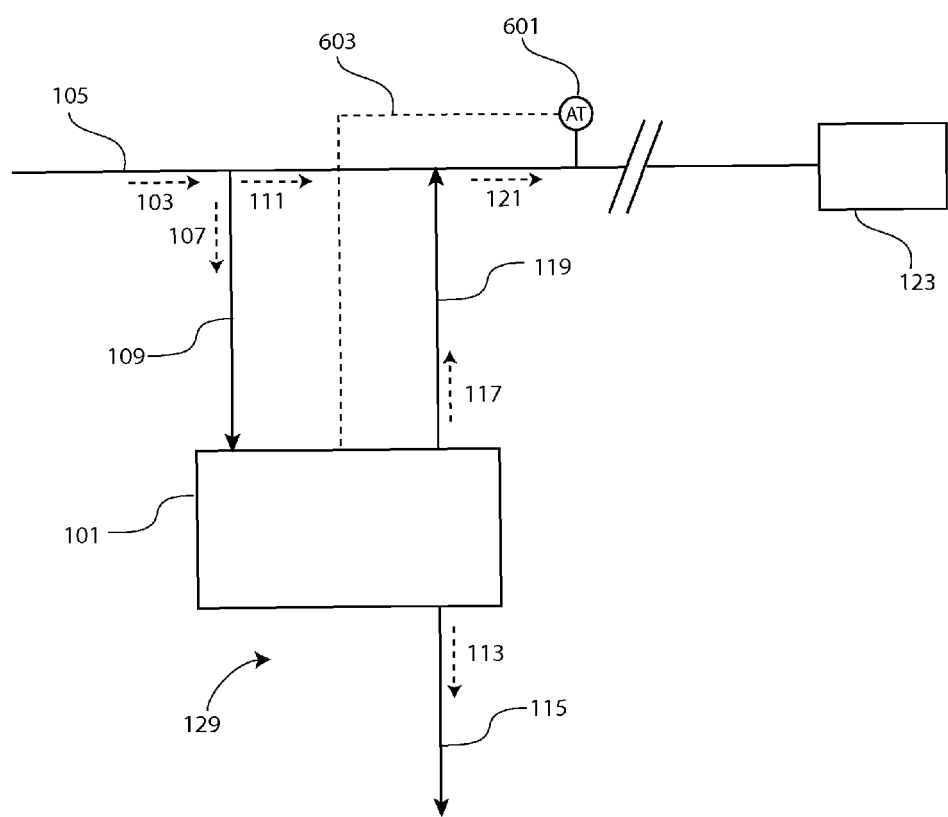
FIG. 6 shows a high-level system diagram of a wastewater concentrator system that adjusts solids loading in a sewer main to a pre-determined amount.

FIG. 6 shows a high-level system diagram of a wastewater concentrator 101 that is adapted to adjusting the solids loading to a pre-determined amount. Like the embodiment shown in FIG. 1, a portion of the diverted raw wastewater 107 is diverted from the sewer main 105 through an inlet pipe 109 into the wastewater concentrator system 101. In a manor previously disclosed, wastewater is separated into separated liquid 113 through a outlet pipe 115 and concentrated solids 117 through a second outlet pipe 119. The separated liquid 113 can be diverted for local reuse or for disposal. The concentrated solids 117 in the second outlet pipe 119 are reintroduced in the sewer main 105. The concentrated solids 117 are combined with the non-diverted wastewater 111 to form concentrated wastewater 121 in the sewer main. The resulting concentrated wastewater 121 has increased suspended solids. A portion of wastewater has been removed from the sewer main 105 that is approximately equal to the separated liquid 113 diverted through the outlet pipe 115. This has the effect of increasing the system capacity of the sewer main 105 by an amount equal to the separated liquid 113 and also increasing the solids loading in the concentrated wastewater 121.

In accordance with principals of the invention, the solids loading of sewer main 105 is adjusted to a pre-determined level or pre-determined amount. The pre-determined amount, for example, may be selected to assure that the wastewater treatment plant 123 operates within its solids loading capacity. In one embodiment, a solids analyzer 601 determines the solids loading of the concentrated wastewater 121 in the sewer main 105. The solids analyzer 601 communicates with the wastewater concentrator 101 through a signal pathway 603. This information transmitted through the signal path 603 can take many alternative forms, for example, analog voltage, or a digital signal. This may be either through wire or by wireless means.

Figure 7:
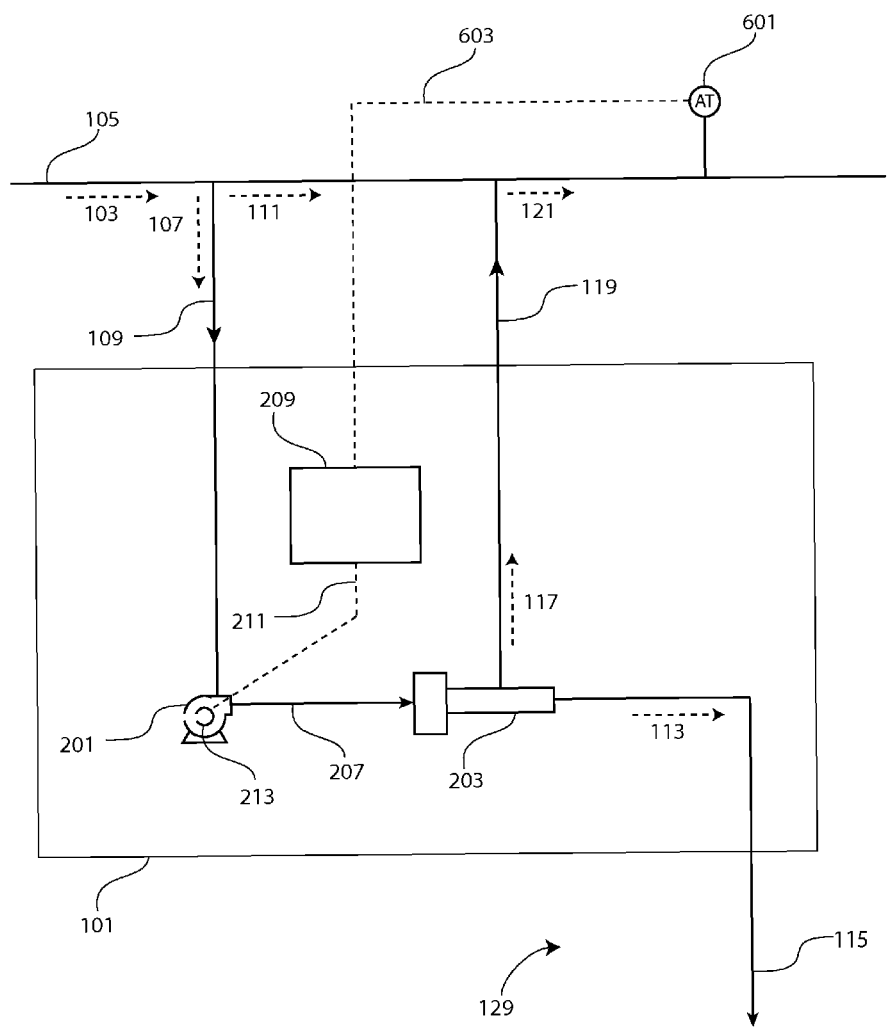
FIG. 7 shows a more detailed embodiment of FIG. 6.

FIG. 7 is an embodiment, in accordance with principals of the invention, of FIG. 6. The embodiment of FIG. 7 operates in a similar manner as the embodiment of FIG. 2 except in the present embodiment the control system 209 controls the VFD 213 of the feed pump 201 in order to adjust the solids loading to a pre-determined amount rather than the solids loading.

The solids analyzer 601 measures solids loading of the concentrated wastewater 121 in the sewer main 105 and communicates this information through the signal path 603 to a control system 209. The control system 209 controls the speed of the feed pump 201 in order to adjust the rate of flow of diverted raw wastewater 107 in the inlet pipe 109 and to the vortex separator 203. In one embodiment, a variable frequency drive or VFD 213 controls the feed pump 201 through a second signal pathway 211. The signal path 603 can be, for example, an analog drive current, or digital signal or analog voltage and may be wired or wireless.

The control system 209 controls the rate of flow of the feed pump 201 in order to adjust the solids loading of the sewer main 105 to the pre-determined level or pre-determined amount. In one embodiment, the control system 209 uses an algorithm similar to the one shown in FIG. 8, to adjust the post system solids loading of the sewer main 105 to the pre-determined amount. The post system solids loading 801 is determined and compared 803 to the pre-determined amount or target solids loading 805. In one embodiment, if the post system solids loading 801 is greater than the target solids loading 803 than the rate of flow is decreased 807, if the post system solids loading 801 is less than the target solids loading 805, than the rate of flow is increased 809, and if the post system solids loading 401 is approximately equal to target solids loading 805, than the rate of flow is not adjusted 811. The algorithm loops back 813 to determine pre-system wastewater loading step 801 and repeats again.

In an alternate embodiment, the target solids loading 805 is not a specific value but a range of values. This pre-set range can be set in order to enhance stability of the feedback control system and the life of the variable frequency drive. The rate of flow would be decreased 807 if the post-system solids loading 801 was greater than the pre-set range, increased rate of flow 809 would occur if the post-system solids loading 801 was less than the pre-set range, and steady rate of flow 811 would continue if the post-system solids loading was within the pre-set range.

Figure 8:
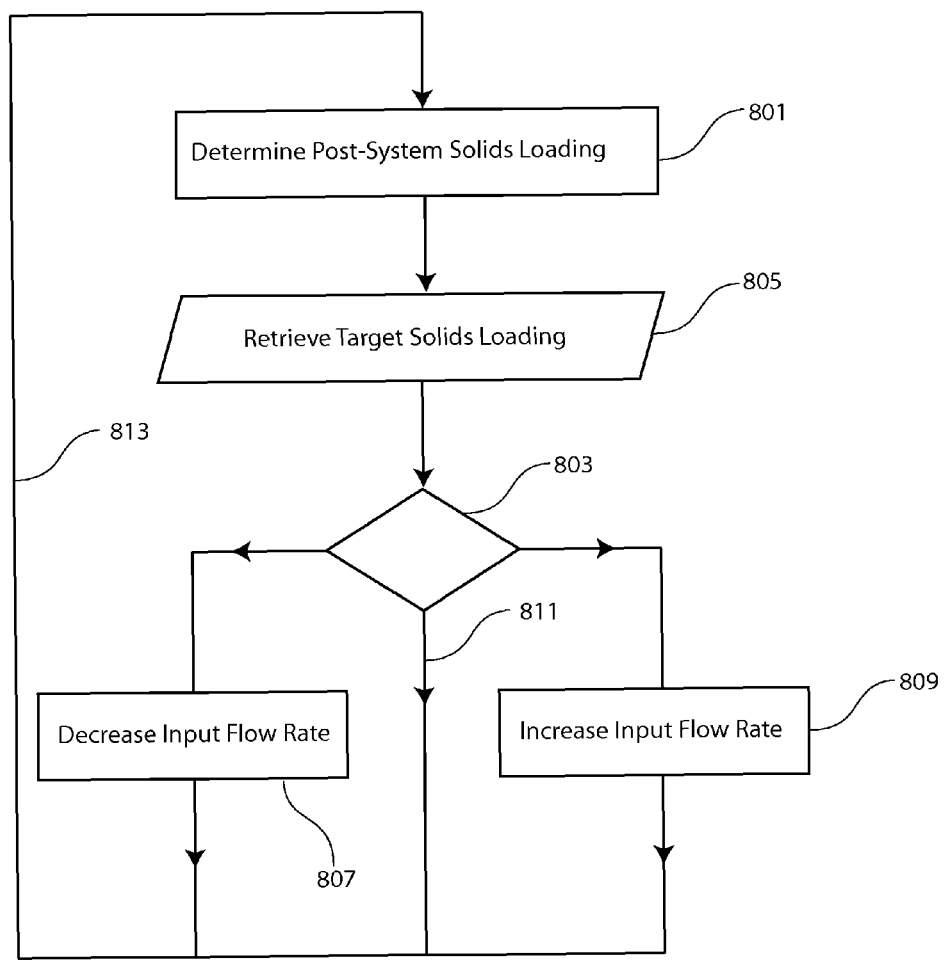
FIG. 8 shows a flow chart diagram in accordance with principles of the invention for controlling solids loading in a sewer main.

Referring to both FIG. 7 and FIG. 8, determining the post system solids loading 801 in the control system 209 is facilitated by data from the solids analyzer 601. The control system 209 compares the desired solids loading 805 to the post system solids loading 801 and either adjusts directly or generates a signal to control the VFD 213 in order to adjust the rate of flow 807. If the post system solids loading 801 of the sewer main 805 is too low, then the VFD 213 speed is increased in order to increase the rate of flow to generate more separated liquid 113 and divert more wastewater from the sewer main 105. If the post system solids loading 801 of the sewer main 205 is too high, than then the VFD speed is decreased in order to decrease the rate of flow to generate less separated liquid 113 and divert less wastewater from the sewer main.

The target solids loading 805, in one embodiment is loaded into either program or data storage memory in the control system 209. Optionally, the target solids loading 805 level may be adjusted on-site at the wastewater concentrator or remotely. For example, it can be updated through wired or wireless means such USB, 802.11, Ethernet, 3G or other standard communication protocol.

As with the algorithm of FIG. 4, the algorithm of FIG. 8 can be stored in the form of program instructions, for example, in a memory device connected to or internal to a microcontroller or microprocessor, a programmable logic device, a remote personal computer (PC) controlling the control system 209, and executed by any combination of these devices.

Figure 9:
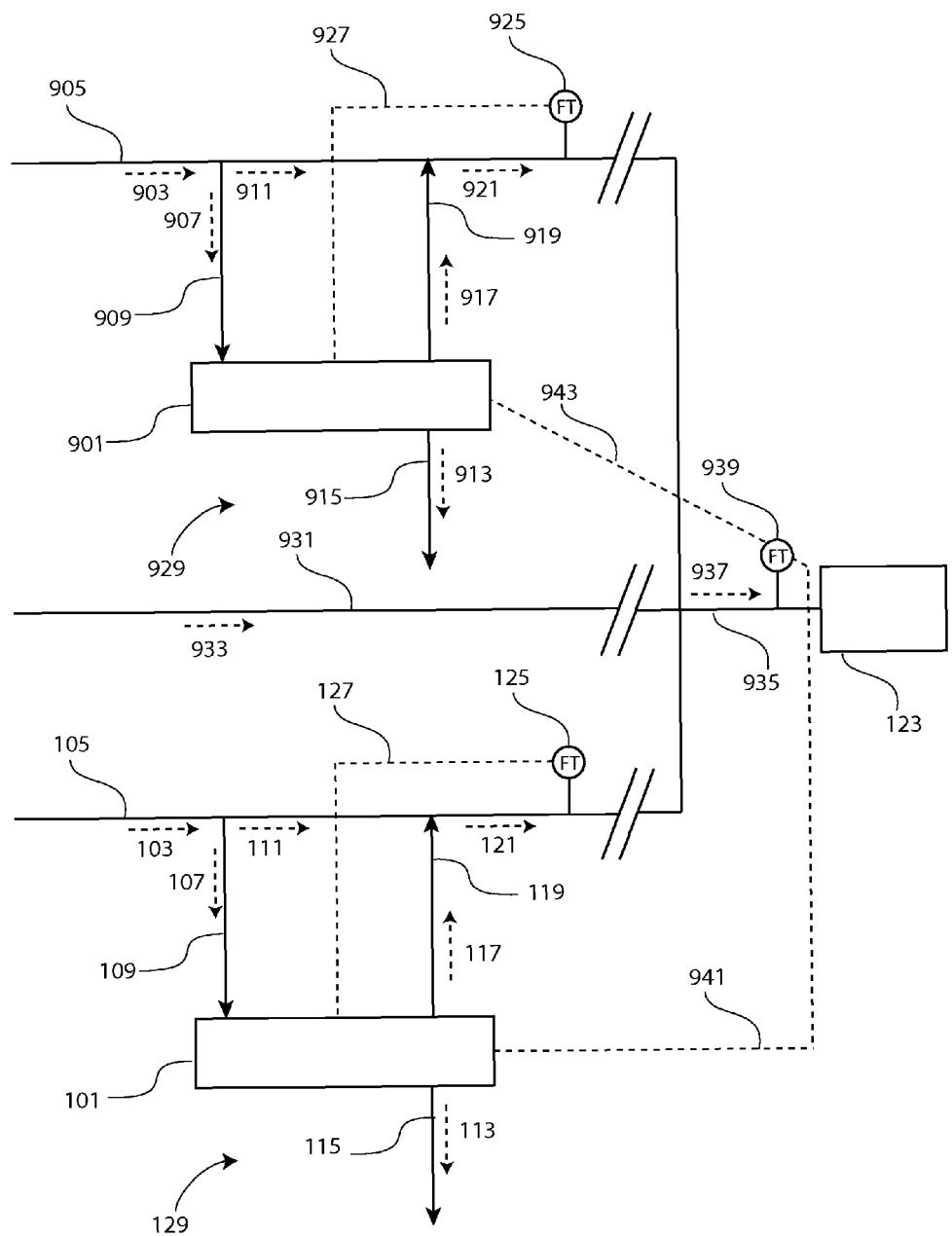
FIG. 9 shows an alternate embodiment of FIG. 1 showing a plurality of wastewater concentrators.

FIG. 9 is a high-level system diagram showing a wastewater piping system with several laterals or secondary sewer mains. In addition to wastewater concentrator 101 shown in FIG. 1, FIG. 9 shows a second wastewater concentrator 901. Wastewater 903 flows through the secondary sewer main 905. A diverted wastewater portion 907 flows through inlet pipe 909. The non-diverted wastewater 911 remains in the sewer main 905. In accordance with principles of the invention that have been described in this disclosure, the wastewater is separated into separated liquid 913 through an outlet pipe 915 and concentrated solids 917 through a second outlet pipe 919 connected to the sewer main 905. The separated liquid 913 can be diverted for local reuse or disposal. In one embodiment, the separated liquid 913 is mostly water but main contain BOD or dissolved solids. This can be pumped deep into the ground in order to facilitate natural filtration. In another embodiment, the separated liquid 913 is further purified and sterilized and can be used for agricultural or commercial irrigation or for drinking water.

The concentrated solids 917 in the second outlet pipe 919 are reintroduced in the sewer main 905. The concentrated solids 917 are combined with the non-diverted wastewater 911 to form concentrated wastewater 921 in the sewer main. The resulting concentrated wastewater 921 has increased suspended solids. A portion of wastewater has been removed from the secondary sewer main 905 that is approximately equal to the separated liquid 913 diverted through the outlet pipe 915. This has the effect of increasing the system capacity of the sewer main 905 by an amount equal to the separated liquid 913. By increasing the system capacity of the sewer main 905 in this way, the wastewater loading of the sewer main 905 has been effectively been decreased.

In accordance with principals of the invention, the wastewater loading of secondary sewer main 905 is adjusted to a pre-determined level or pre-determined amount. This predetermined amount may be set in accordance with a number of factors. For example, the pre-determined level may be set in order to make sure that the sewer main 905 is not over loaded during peak capacity. Similarly, the pre-determined level may be set in order to assure that the total wastewater 923 supplied to the wastewater treatment plant 123 supplied is not over loaded during peak demand.

In an embodiment, a flow transmitter 925 determines the rate of flow of the concentrated wastewater 921 in the secondary sewer main 905. The flow transmitter 925 communicates with the second wastewater concentrator 901 through a signal path 927. This information transmitted through the signal path can take many alternative forms, for example, analog voltage, or a digital signal. This may be either through wire or by wireless means.

As previously described, it may be desirable to adjust the flow in each wastewater lateral in accordance with a combination of the desired wastewater loading on the lateral itself and the overall wastewater loading on the entire wastewater system. In FIG. 9 there are three laterals: the sewer main 105, a first secondary sewer main 905, and a second secondary sewer main 931. The total wastewater supplied 923 supplied through sewer main portion 935 at the inlet of the wastewater treatment plant 123 is a combination of concentrated wastewater 121 from sewer main 105, concentrated wastewater 921 from the first secondary sewer main 905 and wastewater 933 from the second secondary sewer main 931. A flow transmitter 939 located long the sewer main portion 935 at the inlet of the wastewater treatment plant 123 measures the flow of the total wastewater supplied 923. The flow transmitter 939 sends flow data to the second wastewater concentrator 901 through a signal path 943 and to the first wastewater concentrator 101 through another signal path 941. These signal paths may be analog, digital, wired or wireless. Both signal paths may be combined into a single multiplexed signal path and received by each wastewater concentrator using a unique identifier.

Figure 10:
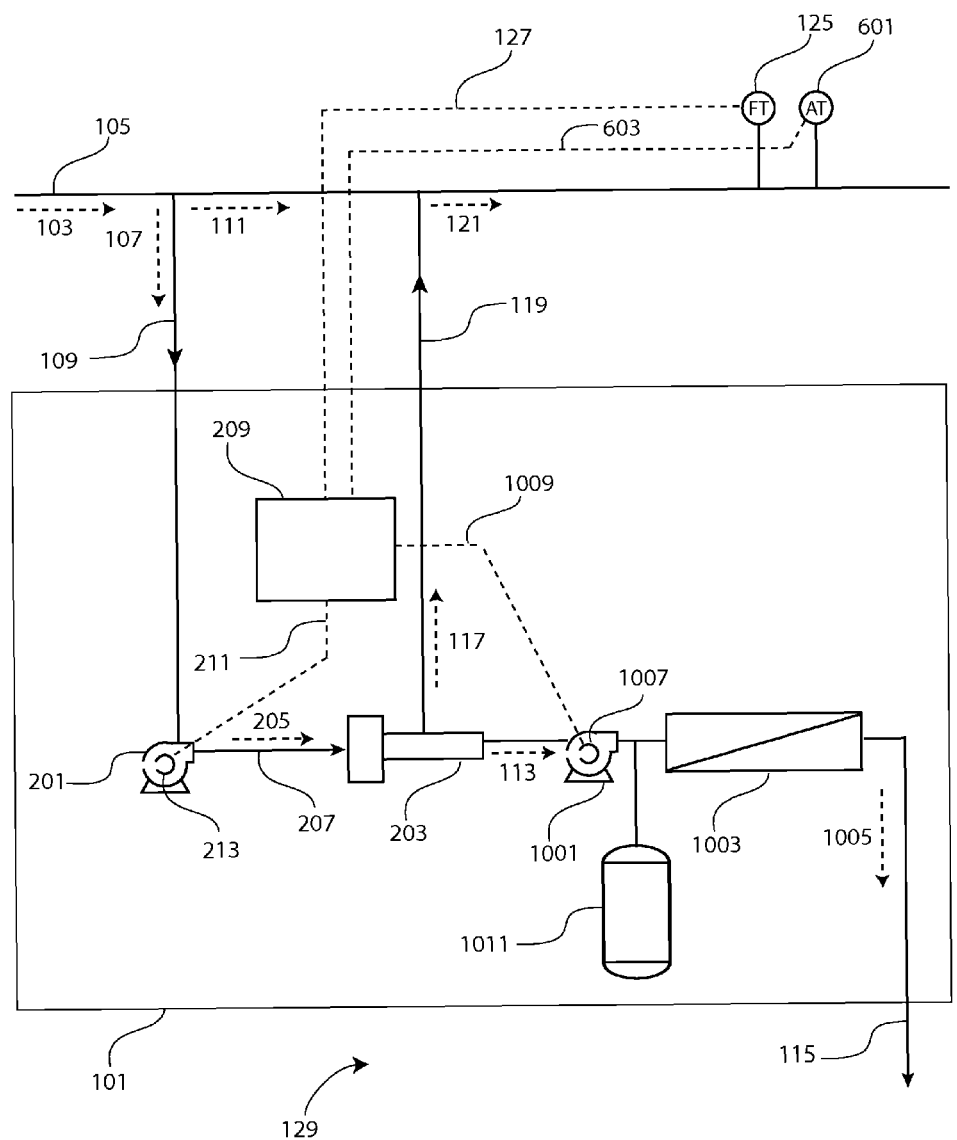
FIG. 10 shows an alternative embodiment of FIG. 2 showing means for purifying the separated liquid and a combination of controlling both solids loading and wastewater loading.

FIG. 10 shows a wastewater concentrator system with additional filtration and capable of controlling both wastewater loading and solids loading. The separated liquid 113 from the vortex separator 203 enters a feed pump 1001. The feed pump 1001 pumps the separated liquid 113 into a membrane filtration unit 1003. The membrane filtration unit 1003 removes most of the remaining particulates producing purified water 1005 that is discharged through outlet pipe 115. A VFD 1007 controls the speed of the feed pump 1001 used to pump the separated liquid 113 into the membrane filtration unit 1003. The control system 209 regulates the VFD 1007 through a signal path 1009. The signal path 1009 may be analog, digital, wired or wireless. In an alternative embodiment, a control valve can be used instead the VFD 1007 to control the flow of the separated liquid 113 into the membrane filtration unit 1003. In this alternative embodiment, the control system would regulate the position of control valve and the feed pump 1001 would a constant speed.

The membrane filtration unit 1003 can use nano-filtration, ultra-filtration, micro-filtration, reverse osmosis, or other equivalent membrane filtration technique for separating particles from water for the purpose of purifying the water. In an alternate embodiment, the purified liquid may be further purified and sterilized for local reuse, for example, for irrigation, potable water, or industrial use. In another embodiment, the purified liquid can be disposed of in nearby body of water, such as rivers, lakes, streams, or the ocean. Alternatively, the purified liquid can be disposed of by pumping it into the ground and allowing for further natural filtration. Depending on local environmental requirements and/or governmental regulations, the purified liquid may be further purified or sterilized before disposal or reuse.

Membrane filtration units generally have an optimum operational rate of flow. In order to main a constant rate of flow through the membrane filtration unit 1003, a storage tank 1011 can be employed to divert excess of the separated liquid 113 from the membrane filtration unit 1003 during periods of higher demand and reintroduce the separated liquid 113 to the membrane filtration unit 1003 during periods of lower demand.

The feed pump 1001 may be eliminated in a gravity feed system where there is sufficient pressure from the separated liquid 113 on the membrane filtration unit 1003 to allow the membrane filtration unit 1003 to operate.

In an alternative embodiment, a media or multi-media filter can be substituted for the membrane filtration unit 1003. Media filtration devices can include, for example, sand, anthracite, manganese green sand, clinoptilolite (zeolite), or activated carbon filtration units. Multi-media filtration units can include multiple layers of filtration media, for example, in one embodiment, a multi-media filter includes a combination of layered sand, anthracite, and garnet. Using a media or multi-media filter in place of the membrane filtration unit 1003, the storage tank can be eliminated if desired.

In another alternative embodiment, the membrane filtration unit 1003 and storage tank 1011 can be replaced by an aeration pond. The aeration pond can be used to oxidize aerobic bacteria and reduce the BOD and chemical oxygen demand of the separated liquid 113. The resultant liquid then further purified by filtration. Depending on local regulatory or environment conditions, the aeration pond can be followed by chemical, mechanical, thermal, or electrical filtration methods before disposal or reuse.

Figure 11:
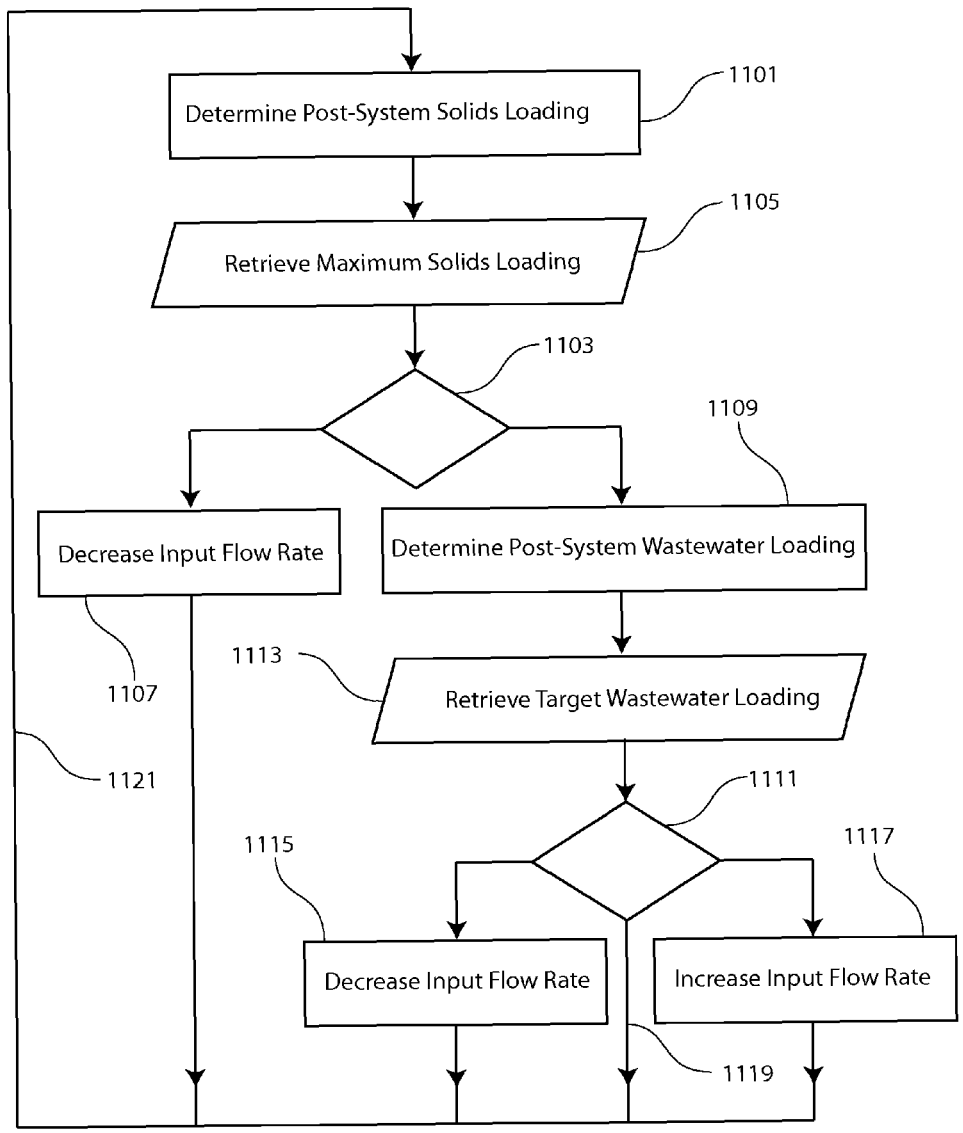
FIG. 11 shows a flow chart, in accordance with principles of the invention, for the controlling both solids loading and wastewater loading.

The control system of FIG. 10 can use both the solids loading of the concentrated wastewater 121 as measured by the solids analyzer 601 and the flow of the concentrated wastewater 121 as measured by the flow meter 125 to adjust the amount of diverted raw wastewater 107 removed from the sewer main 105 and the amount of concentrated solids 117 reintroduced into the sewer main 105. FIG. 11 is a flow chart for the wastewater concentrator of FIG. 10 showing an example of a method for accomplishing this.

Referring to FIG. 10 and FIG. 11, the solids analyzer 601 in combination with the control system 209 determines post-system solids loading 1101. The determined post-systems solids loading 1101 is compared 1103 to target maximum solids loading 1105. If the post-system solids loading 1101 is greater than or equal to the target maximum solids loading 1105 than the control system 209 decreases the input rate of flow 1107 by sending a signal to the VFD 213 to slow down the inlet feed pump 201. If the post-system solids loading 1101 is less than the target maximum solids loading 1105 than control system in combination with the flow transmitter 125 determines the post-system wastewater loading and compares 1111 it to the retrieved target wastewater loading 1113. If the post-system wastewater loading is less than the retrieved target wastewater loading than the control system 209 decreases input rate of flow 1115 of the feed pump 201 in order to decrease the flow of diverted raw wastewater 107 out of the sewer main 105. If the determined post-system wastewater loading 1109 is greater than the retrieved target wastewater loading 1113, than the control system 209 increases rate of flow 1117 of the feed pump 201 in order to increase the flow of diverted raw wastewater 107. If the determined post-system wastewater loading 1109 is equal to the retrieved target wastewater loading 1113, the rate of flow is not adjusted 1119. The algorithm then loops back 1121 to the beginning and starts again.

Both the target maximum solids loading 1105 and target wastewater loading 1113 can be ranges of values rather then single values to enhance stability of the feedback control system. In one embodiment, if the post-system solids loading 1101 is greater than the target maximum solids loading range than the control system 209 decreases the input rate of flow 1107. If the post-system solids loading 1101 is less than the target maximum solids loading range, than the determined post-system wastewater loading 1109 is compared with the target wastewater loading range. If the determined post-system wastewater loading 1109 is within the target wastewater loading range, the flow is not adjusted. If the determined post-system wastewater loading 1109 is less than the target wastewater loading range, than the control system 209 decreases input rate of flow 1115. If the determined post-system wastewater loading 1109 is greater than the target wastewater loading range, the control system 209 increases input rate of flow 1117 so that more diverted raw wastewater 107 is removed from the sewer main 105 in order to decrease the wastewater loading.

Combining a multi-wastewater concentrator of FIG. 9 with the wastewater concentrator disclosed in FIG. 10 and FIG. 11 that responds to both solids loading and wastewater loading, it is possible to create a wastewater system that can respond to changing conditions in each part of the system and target wastewater loading and total maximum solids loading accordingly.

Figure 12:
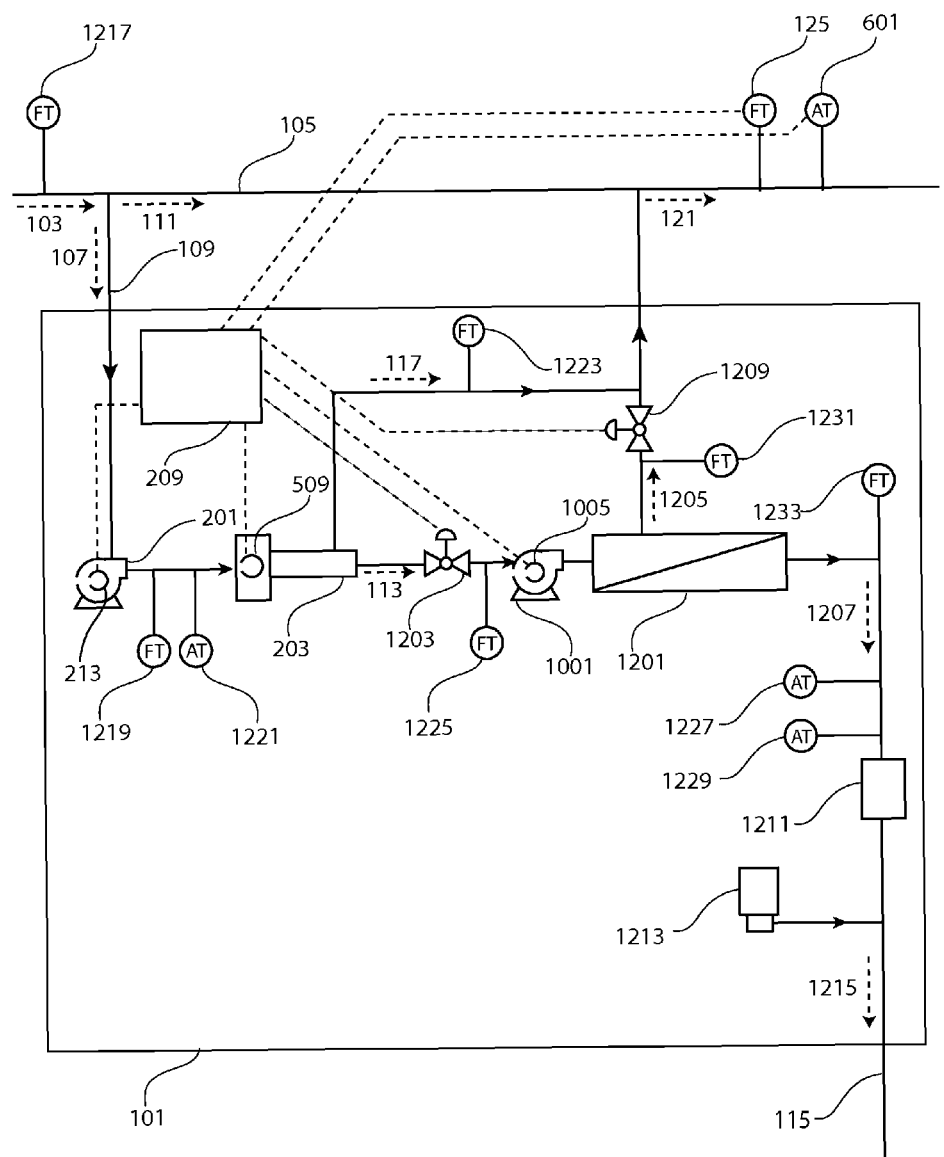
FIG. 12 shows an alternative embodiment of FIG. 2 showing alternative means for purifying separated liquid.

FIG. 12 shows an embodiment with an alternative control and additional purification of the separated liquid. Referring to FIG. 12, the separated liquid 113 flows from the vortex separator 203 to the feed pump 1001. The feed pump 1001 supplies enough net positive suction pressure to supply the separated liquid 113 to a nano-filtration membrane unit, also known as a membrane filtration membrane polisher or NFMP 1201. Restricting and modulating the flow of the two streams can be used to determine the fractionation ratio and rate of flow. The concentrated solids stream flow can be regulated by the speed of the separator VFD 509 in combination with a first flow valve 1203. The first flow valve 1203 can be controlled by the control system 209.

The NFMP 1201 further fractionates the separated liquid 113 into two streams: a concentrate stream 1205 and a product stream 1207. The concentrate stream 1205 is the water containing all residual suspended solids having a specific gravity to close to water to be efficiently removed by the voraxial separator plus a percentage of the dissolved solids. This is typically 10% to 15% of the total product fraction output of the NFMP. This portion may deviate significantly above or below this range depending on the efficiency of the vortex separator 203 at removing the suspended solids from the stream before it reaches the NFMP 1201 and also depending on the design of the NFMP 1201 itself. The concentrate stream 1205 resulting from the NFMP 1201 is combined with the concentrated solids stream 117. Both streams are returned to sewer main 105. The concentrated wastewater 121 in this embodiment is a combination of the non-diverted wastewater 111+the concentrated solids stream 117+the concentrate stream 1205. A control valve 1209 creates backpressure on the concentrate stream 1205 leaving the NFMP 1201 and can be used to control the portion of concentrate stream leaving the NFMP 1201.

The product stream 1207 is mostly water that is essentially free of suspended solids and typically has a BOD<5 mg/liter. This portion is typically 85-90% of the total output of the NFMP 1201. The percentage of product water to concentrate is referenced as the "recovery" of the NFMP 1201. Additional steps of media filtration followed by a distillation/evaporator column can be added to further remove traces of suspended, colloidal matter, and volatile organics not removed by the vortex separator 203.

The product stream 1207 passes through an ultraviolet light unit 1211 that destroys residual bacteria. A chlorine dispensing unit 1213 adds chlorine to the resulting purified water 1215 as a bacteria static agent (disinfection) to prevent the growth of bacteria during storage prior to use. Typically, enough chlorine is added to give a residual concentration of 1 to 1.5 mg/liter of free chlorine in the resulting purified water 1215. Introduction of amounts of chlorine to produce other ratios are also possible and depend on national, regional and local regulatory standards. The resulting purified water 1215, in one embodiment, may be used for local irrigation or may be further processed for use as potable drinking water. In another embodiment, the purified water 1215 can be used for cooling tower makeup water or other industrial uses. Alternatively, the purified water 1215, or a portion of the purified water 1215, can be diverted for disposal. This can be disposed of, for example, by pumping the purified water 1215 into the ground.

Other examples of disposal include disposal into a nearby body of water, for example, an ocean, lake, river, stream, canal, or a constructed wetland.

The wastewater is diverted from the sewer main 105 at a deliberate rate and the resultant concentrated solids 117 and concentrate stream 1205 are reintroduced into the sewer main 105 in a deliberate amount in order to control the wastewater loading and concentrated solids of the wastewater system. This can be controlled by control system 209 dynamically as previously described.

While the control of wastewater loading and solids loading in the sewer main 105 can be accomplished with a minimal number of sensors and feed pumps as previously described, a system with more measurement and control capability may be desirable. Again referring to FIG. 12, additional flow transmitters and solids analyzers are employed. It should be understood by the reader that the flow transmitters and solids analyzers in FIG. 12 are capable of communicating with the control system 209. This communication may be analog, digital, wired or wireless. It may be multiplexed on a single transmission channel.

A pre-system located flow sensor 1217 installed in sewer main 105 can be used by the control system to determine wastewater loading conditions before the wastewater concentrator 101. The quantity of raw wastewater diverted to the wastewater concentrator 101 is sensed by inlet flow sensor 1219. A suspended solids transmitter 1221 measures the percent of suspended solids present. As previously described, the quantity of wastewater diverted is determined by the speed of feed pump 201. In an embodiment, the speed of the feed pump 201 is adjusted by controlling the VFD 213 of the feed pump 201 through an adjustable set-point process control loop. The separation the diverted raw wastewater 107 in concentrated solids 117 and separated liquid 113 is controlled in FIG. 12 by the first flow valve 1203 and speed adjustment of the separator VFD 509. A flow transmitter 1223 measures the flow of the concentrated solids stream 117. The separated liquid flow transmitter 1225 measures the flow of the separated liquid 113 into the feed pump 1001 supplying the NFMP 1201. An analyzer transmitter 1227 measures the product stream 1207 conductivity. A pH analyzer transmitter 1229 measures the pH of the product stream 1207.

Figure 13:
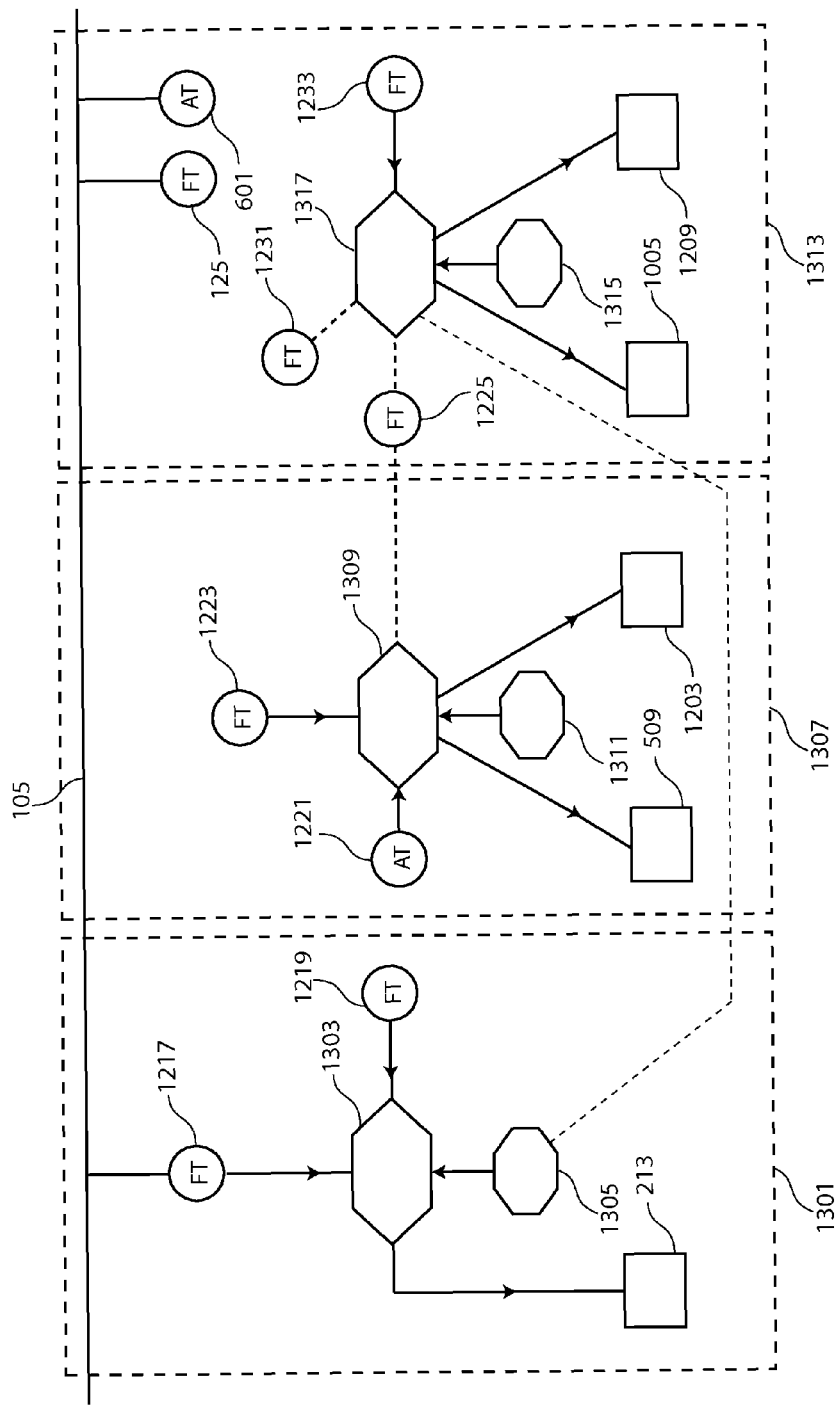
FIG. 13 shows a control system diagram for the embodiment of FIG. 12.

FIG. 13 is a diagram outlining the use of three control loops for controlling the flow of the wastewater separator. This should not be taken as the only approach to maintaining control of the system. Control loop 1313 controls the final product output, which in the embodiment of FIG. 12, is the resulting purified water 1215. In the final product control loop 1313, three flow transmitters control the set point 1315 for the flow/ratio controller 1317:separated liquid flow transmitter 1225, concentrate stream flow transmitter 1231, and product stream flow transmitter 1233. A flow ratio controller 1317 uses these three flow transmitters to maintain the product stream 1207 at a constant rate of flow and a constant ratio of product stream 1207 to concentrate stream 1205. This is desirable because membrane separators generally have an optimal operational rate of flow. The set point value 1315 for the final product control loop 1313 is feedback through the control system to determine the set point of 1305 in first control loop 1301. In one embodiment, the output of the inlet flow transmitter 1219 will display the actual flow being transferred from the sewer main 105 for wastewater concentrator throughput. Flow Controller 1303 adjusts the VFD 213 on the inlet feed pump 201 to maintain correct flow to the system as required to maintain a constant flow of the product stream 1207. The middle control loop 1307 is designed to maintain the operation of the vortex separator 203. The separated liquid flow transmitter 1225 in the final product control loop 1313 is used to determine the second control loop set point 1311. The speed of vortex separator 203 is adjusted to maintain a desired ratio of concentrated solids stream 117 as measured by the flow transmitter 1223 of the concentrated solids 117 and separated liquid 113 as measured by the flow transmitter 1225 of the separated liquid 113.

Within this disclosure flow transmitters have been used to measure flow and report the rate of flow and flow related information to the control system 209. Similarly, solids analyzers have been used to measure solids loading and report solids loading related information to the control system 209. The invention is by no means limited to these instruments for measuring flow and solids loading. Those skilled in the art will readily recognize equivalents. For example, there many means for measuring flow, flow transmitters or flow meters can include but are not limited to a magnetic flow meter, turbine flow meter, vortex flow meter, differential pressure meter, and paddle wheel flow meter. Suspended solids meters can include mass flow meters or infrared meters.

Both FIG. 1 and FIG. 9 show the separated liquid 113 flowing through the outlet pipe 115 of the first wastewater concentrator 101. Similarly, FIG. 9 shows separated liquid 913 flowing through the outlet pipe 915 of the second wastewater concentrator 901. It should be understood by the reader that in alternative embodiments further purified water could flow through either the outlet pipe 115 of the first wastewater concentrator 101 and/or the outlet pipe 915 of the second wastewater concentrator. For example, in FIG. 10, purified water 1005 flows through the outlet pipe 115. In FIG. 12, further purified water 1215 flows through the outlet pipe 115 of the first wastewater concentrator 101.

While various methods for treating the separated liquid 113 have been demonstrated, it is not the inventors intent to limit treatment of the separated liquid 113 to these methods and apparatus. It should be also understood, by those skilled in the art, that other treatment methods and apparatus can be applied either alone or in combination. Referring to FIG. 12, for example, a media filter, a multi-media filter, polymer coagulation unit, or a cartridge filtration unit (for example, pleated paper, porous ceramic, or filament wound cartridges) can be applied before the feed pump 1001 and NFMP 1201.

Accordingly, a wastewater concentrator method and system meeting the herein described objectives have been described. It is not the intent of this disclosure to limit the claimed invention to the examples, variations, and exemplary embodiments described in the specification. Those skilled in the art will recognize that variations will occur when embodying the claimed invention in specific implementations and environments. For example, it is possible to implement certain features described in separate embodiments in combination within a single embodiment. Similarly, it is possible to implement certain features described in single embodiments either separately or in combination in multiple embodiments. It is the intent of the inventor that these variations fall within the scope of the claimed invention. While the examples, exemplary embodiments, and variations are helpful to those skilled in the art in understanding the claimed invention, it should be understood that, the scope of the claimed invention is defined solely by the following claims and their equivalents.

What is claimed is:

1. A system for adjusting wastewater loading in a sewer main thereby increasing the effective system capacity of the sewer main, comprising:
   piping for diverting a portion of wastewater from the sewer main;

means for determining the wastewater loading in the sewer main;
means for separating concentrated solids and separated liquid from the diverted wastewater;
means for reintroducing the concentrated solids back into the sewer main; and
means for dynamically adjusting a rate of diversion of wastewater from the sewer main and a rate of reintroducing the concentrated solids back to the sewer main in response to the means for determining the wastewater loading in the sewer main and in a proportion that adjusts the wastewater loading of the sewer main to a value within a preset range.

2. The system of claim 1, wherein the means for separating the concentrated solids and the separated liquid from the diverted wastewater includes a vortex separator.

3. The system of claim 1, further including:
means for determining solids loading on the sewer main; and
means for adjusting the wastewater loading so that dynamically adjusting the rate of diversion of wastewater from the sewer main and the rate of reintroducing the concentrated solids back to the sewer main does not cause the sewer main to exceed a maximum solids loading.

4. The system of claim 1, further including means for treating the separated liquid.

5. The system of claim 4, wherein the means for separating the concentrated solids and the separated liquid from the diverted wastewater includes a vortex separator.

6. The system of claim 4, further including:
means for determining solids loading on the sewer main; and
means for adjusting the wastewater loading so that dynamically adjusting the rate of diversion of wastewater from the sewer main and the rate of reintroducing the concentrated solids back to the sewer main does not cause the sewer main to exceed a maximum solids loading.

7. The system of claim 4, further including means for treating the separated liquid for disposal.

8. A system for adjusting solids loading in a sewer main thereby increasing the effective system capacity of the sewer main, comprising:
piping for diverting a portion of wastewater from the sewer main;
means for determining the solids loading in the sewer main;
means for separating concentrated solids and separated liquid from the diverted wastewater; and
means for dynamically adjusting a rate of reintroducing the concentrated solids back into the sewer main and a rate of diversion of wastewater from the sewer main in response to the means for determining the solids loading in the sewer main and in a proportion that adjusts the solids loading of the sewer main not to exceed a preset quantity.

9. The system of claim 8, wherein the means for separating the concentrated solids and the separated liquid from the diverted wastewater includes a vortex separator.

10. The system of claim 8, further including means for treating the separated liquid.

11. The system of claim 10, further including means for treating the separated liquid for disposal.

12. The system of claim 10, further including means for treating the separated liquid for reuse.

13. A system for adjusting wastewater loading in a sewer main thereby increasing the effective system capacity of the sewer main, comprising:

piping for diverting a portion of wastewater from the sewer main;
means for determining the wastewater loading in the sewer main;
means for separating concentrated solids and separated liquid from the diverted wastewater;
means for reintroducing the concentrated solids back into the sewer main; and
means for dynamically adjusting a rate of diversion of wastewater from the sewer main and a rate of reintroducing the concentrated solids back to the sewer main in response to the means for determining the wastewater loading in the sewer main and in a proportion that adjusts the wastewater loading of the sewer main not to exceed a preset quantity.

14. The system of claim 13, wherein the means for separating the concentrated solids and the separated liquid from the diverted wastewater includes a vortex separator.

15. The system of claim 13, further including means for treating the separated liquid.

16. The system of claim 15, wherein the means for separating the concentrated solids and the separated liquid from the diverted wastewater includes a vortex separator.

17. The system of claim 15, further including means for treating the separated liquid for disposal.

18. A system for adjusting wastewater loading in a sewer main, comprising:
a vortex separator that includes an impeller mechanism with a hollow core and a decreasing axial pitch in the direction of fluid flow;
the vortex separator including an inlet arranged and adapted to receive a portion of wastewater diverted from the sewer main, a first outlet for separated liquid, and
a second outlet for concentrated solids, the second outlet operationally connected to the sewer main;
a flow transmitter adapted and arranged to sense the wastewater loading in the sewer main; and
a control system for dynamically controlling a rate of flow of the wastewater diverted from the sewer main and for adjusting a rate of reintroducing the concentrated solids back into the sewer main in response to the wastewater loading in the sewer main sensed by the flow transmitter and in a proportion that adjusts the wastewater loading of the sewer main not to exceed a preset quantity.

19. A system of claim 18, further configured to adjust solids loading of the sewer main, wherein:
the control system includes a solids analyzer arranged and adapted to sense the solids loading of the sewer main; and
the control system is further configured for dynamically controlling a rate of flow of the wastewater diverted from the sewer main and for adjusting a rate of reintroducing the concentrated solids back into the sewer main in response to the solids loading in the sewer main sensed by the solids analyzer and in a proportion that does not cause the solids loading of the sewer main not to exceed a preset quantity.

20. A system of claim 18, further including a membrane filtration unit arranged and adapted to receive the separated liquid.

21. A system of claim 20, wherein:
the membrane filtration unit includes a first outlet adapted for a product stream and a second outlet for a concentrate stream; and
the second outlet is operationally connected to the outlet for the concentrated solids.

22. A system for adjusting solids loading in a sewer main, comprising:
- a vortex separator that includes an impeller mechanism with a hollow core and a decreasing axial pitch in the direction of fluid flow;
- the vortex separator including an inlet arranged and adapted to receive a portion of wastewater diverted from the sewer main, a first outlet for separated liquid, and
- a second outlet for concentrated solids, the second outlet operationally connected to the sewer main;
- a solids analyzer arranged and adapted to sense the solids loading in the sewer main; and
- a control system for dynamically controlling a rate of flow of the wastewater diverted from the sewer main and for adjusting a rate of reintroducing the concentrated solids back into the sewer main in response to the solids loading sensed by the solids analyzer and in a proportion that adjusts the solids loading of the sewer main not to exceed a preset quantity.

23. A system of claim 22, further including a membrane filtration unit arranged and adapted to receive the separated liquid.

24. A system of claim 23, wherein:
- the membrane filtration unit has a first outlet for a product stream and a second outlet for concentrate stream; and
- the second outlet is operationally connected to the outlet for the concentrated solids.

* * * * *